(12) United States Patent
Steury

(10) Patent No.: US 12,082,707 B2
(45) Date of Patent: Sep. 10, 2024

(54) DEVICES AND METHOD TO REMOVABLY SECURE A SEATBACK SHELL TO A SEATBACK FRAME

(71) Applicant: Lippert Components, Inc., Elkhart, IN (US)

(72) Inventor: Douglas V. Steury, New Paris, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 99 days.

(21) Appl. No.: 17/890,085

(22) Filed: Aug. 17, 2022

(65) Prior Publication Data
US 2023/0055017 A1    Feb. 23, 2023

Related U.S. Application Data

(60) Provisional application No. 63/235,902, filed on Aug. 23, 2021.

(51) Int. Cl.
*B60N 2/68* (2006.01)
*A47C 7/40* (2006.01)

(52) U.S. Cl.
CPC ............... *A47C 7/40* (2013.01); *B60N 2/682* (2013.01); *B60N 2/686* (2013.01)

(58) Field of Classification Search
CPC ................................. B60N 2/682; B60N 2/686
USPC .......................................... 297/440.2, 452.14
See application file for complete search history.

(56) References Cited

U.S. PATENT DOCUMENTS

| | | | |
|---|---|---|---|
| 4,008,920 A | 2/1977 | Arndt | |
| 4,176,849 A | 12/1979 | Rehrig | |
| 4,232,899 A | 11/1980 | Fister, Jr. | |
| 4,586,746 A | 5/1986 | Day et al. | |
| 4,746,168 A * | 5/1988 | Bracesco | B60N 2/5816 297/440.2 X |
| 4,976,493 A | 12/1990 | Frankila | |
| 5,064,247 A * | 11/1991 | Clark | A47C 5/046 297/440.2 X |
| 5,085,482 A | 2/1992 | Moehlman et al. | |
| 5,318,345 A | 6/1994 | Olson | |
| 5,437,498 A | 8/1995 | Waelde | |
| 5,536,063 A | 7/1996 | Cable | |
| 5,588,703 A | 12/1996 | Itou | |
| 5,599,070 A | 2/1997 | Pham et al. | |
| 5,842,264 A * | 12/1998 | Roossien | A47C 3/12 297/440.22 |
| 6,105,183 A | 8/2000 | Bly | |
| 6,305,750 B1 * | 10/2001 | Buono | A47C 7/425 297/440.2 X |

(Continued)

*Primary Examiner* — Rodney B White
(74) *Attorney, Agent, or Firm* — NIXON & VANDERHYE P.C.

(57) ABSTRACT

A seatback shell mounting device removably secures a seatback shell to a seatback frame. The seatback shell includes a support member with a base secured to the seatback shell and an outwardly extending arm with an elbow. The elbow is shaped to mate with an upper seatback frame element. A fastening member has a base secured to the seatback shell and an outwardly extending resilient lever arm with a cam surface and a step formed on an underside. The lever arm is shaped to define an underside cradle. The mounting device facilitates assembly and removal of a seatback shell onto a seatback frame.

17 Claims, 15 Drawing Sheets

(56) References Cited

U.S. PATENT DOCUMENTS

| | | | | |
|---|---|---|---|---|
| 6,637,823 B1* | 10/2003 | Ursini | ............... | A47C 7/42 |
| | | | | 297/440.2 X |
| 6,969,121 B2* | 11/2005 | Drajan | ............... | A47C 7/40 |
| | | | | 297/440.2 |
| 7,401,852 B2* | 7/2008 | Humer | ............... | B60N 2/888 |
| | | | | 297/216.12 |
| 7,722,124 B2* | 5/2010 | Peterson | ............... | B29C 43/18 |
| | | | | 297/440.2 |
| 8,973,990 B2* | 3/2015 | Krupiczewicz | ............... | A47C 7/40 |
| | | | | 297/452.14 X |
| 8,998,338 B2* | 4/2015 | Vander Veen | ............... | A47C 7/462 |
| | | | | 297/452.14 X |
| 8,998,339 B2* | 4/2015 | Peterson | ............... | A47C 1/024 |
| | | | | 297/452.14 X |
| 9,663,008 B2* | 5/2017 | Akutsu | ............... | B60N 2/68 |
| 10,926,681 B2* | 2/2021 | Yu | ............... | B60N 2/6009 |
| 2008/0252091 A1 | 10/2008 | Edwards et al. | | |
| 2015/0102650 A1 | 4/2015 | Hosbach et al. | | |
| 2016/0096450 A1* | 4/2016 | Kondrad | ............... | B60N 2/20 |
| | | | | 297/285 |
| 2020/0339020 A1 | 10/2020 | Nakamura et al. | | |
| 2021/0086666 A1* | 3/2021 | Nagai | ............... | B60N 2/64 |
| 2021/0086669 A1* | 3/2021 | Nagai | ............... | B60N 2/503 |
| 2022/0212581 A1* | 7/2022 | Gasko | ............... | B60N 2/682 |
| 2022/0340059 A1 | 10/2022 | Mitsuoka et al. | | |
| 2023/0406176 A1* | 12/2023 | Haubrich | ............... | B60N 2/882 |

\* cited by examiner

DEVICES AND METHOD TO REMOVABLY SECURE A SEATBACK SHELL TO A SEATBACK FRAME

CROSS-REFERENCES TO RELATED APPLICATIONS

This application claims the benefit of U.S. Provisional Patent Application No. 63/235,902, filed Aug. 23, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to devices and a method for removably securing a seatback shell to a seatback frame.

With reference to FIGS. 1-3, according to current methods, a seatback shell 1 is secured to a seatback frame by holes that receive shafts. The registered assembly holes are typically located around the upper perimeter and at the lower portion of the seatback. The holes receive plastic shafts 2, or "Christmas trees" as they are known in the art, which have a plurality of arrowhead like structures along the length of each shaft. Attachment typically requires ten "Christmas trees" that can only be used once since the plastic "arrowheads" are broken upon removal of the seatback shell. Any repair or replacement requires that the seat, the seatback, and seatback shell be returned to the factory for custom fitting of the new back. Manufacture of a seat with numerous registered assembly points adds cost, complications and man-hours to produce the seat product.

SUMMARY

The device and method of the described embodiments include self-guiding and snap-fitting fastening member(s) and upper support members that attach to the seatback frame elements and removably secure the seatback shell to the seatback frame to achieve an aesthetically pleasing seatback. The method also allows the seatback shell to self-center during install on the seatback frame since it is not restricted to small, sparsely located and difficult to align attachment holes. The design allows the support members and fastening members to slide side-to-side thus maintaining a centered alignment of the seatback shell on the frame. The design of the fastening member, by being longer on the inboard side, allows for flexing in order to release the snap-fit of the lever arm and lift the seatback shell off the lower and upper frame elements for easy on-site removal and replacement.

The seatback shell attachment method of the described embodiments resolves the problems of the prior art. The method permits the seatback shell to merely slide downward onto the frame supports and easily snap-fit onto the seatback frame. The seatback/method improves manufacture and seating dynamics as a result of the universality of the support and fastening members while facilitating seat and seatback shell design interchangeability, which may be conveniently performed onsite.

In an exemplary embodiment, a seatback shell mounting device for removably securing a seatback shell to a seatback frame includes at least one support member with a first base securable to the seatback shell and an outwardly extending arm with an elbow. The elbow is shaped to engage the upper seatback frame element. At least one fastening member includes a second base securable to seatback shell and an outwardly extending resilient lever arm with a cam surface and a step formed at an end of the cam surface. The lever arm defines an underside cradle engageable with the lower seatback frame element.

The mounting device may further include an upper riser structure and a lower riser structure each securable to the seatback shell, where the first base of the at least one support member is secured to the upper riser structure, and the second base of the at least one fastening member is secured to the lower riser structure.

The at least one support member may have a pair of reinforcing ribs formed on a topside extending from the first base to a terminal end, and the at least one fastening member may have a central spine formed in a top surface opposite the underside and extending substantially between the second base and the step.

In some embodiments, the mounting device has two support members engageable with the upper seatback frame element and two fastening members engageable with the lower seatback frame element.

The at least one support member may be secured directly to the seatback shell.

In another exemplary embodiment, a seatback assembly includes a seatback shell, a support member secured to the seatback shell and including an outwardly extending arm with an elbow, and a fastening member secured to the seatback shell, where the fastening member includes an outwardly extending resilient lever arm with a cam surface and a step formed on an underside the lever arm defining an underside cradle. A seatback frame includes an upper frame element and a lower frame element, and when the seatback shell is secured to the seatback frame, the outwardly extending arm of the support member engages the upper frame element, and the fastening member engages the lower frame element.

The resilient lever arm may be flexible, where the cam is configured to deflect the resilient lever arm outward when the cam engages the lower frame element until the lower frame element reaches the step, after which the underside cradle engages the lower frame element in a snap-fit. When the underside cradle engages the lower frame element, the support member may be positioned to bear against the upper frame element. The seatback shell may be removable from the seatback frame. In this context, the resilient lever arm may be manually displaceable to clear the step from the lower frame element, after which the seatback shell is removable from the seatback frame.

The support member and the fastening member may be formed of plastic via plastic injection molding.

In yet another exemplary embodiment, a method for removably securing a seatback shell to a seatback frame may include the steps of securing the support member and the fastening member to the seatback shell so that the arm of the support member and the lever arm of the fastening member extend in a direction outward from the seatback shell; lowering the seatback shell onto the seatback frame from a top of the seatback frame toward a seat of the seatback frame so that the arm of the support member contacts a first seatback frame element of the seatback frame and so that the resilient lever arm of the fastening member contacts a second seatback frame element of the seatback frame; and applying a downward force to the seatback shell in a direction toward the seat of the seatback frame to guide the cam surface over the second seatback frame element until the step catches the seatback frame element to snap-fit the fastening member against the second seatback frame element, so that the first seatback frame element is made to bear against a bearing surface of the support member, and so that the second seatback frame element is positioned in the underside cradle.

The step of applying the downward force to the seatback shell may cause the cam surface to deflect the resilient lever arm away from the second seatback frame element.

The method may further include removing the seatback shell from the seatback frame by manually displacing the resilient lever arm away from the seatback shell to clear the step from the second frame element, and applying an upward force to the seatback shell in a direction away from the seat of the seatback frame.

BRIEF DESCRIPTION OF THE DRAWINGS

These and other aspects and advantages will be described in detail with reference to the accompanying drawings, in which.

DETAILED DESCRIPTION

Figure 1:
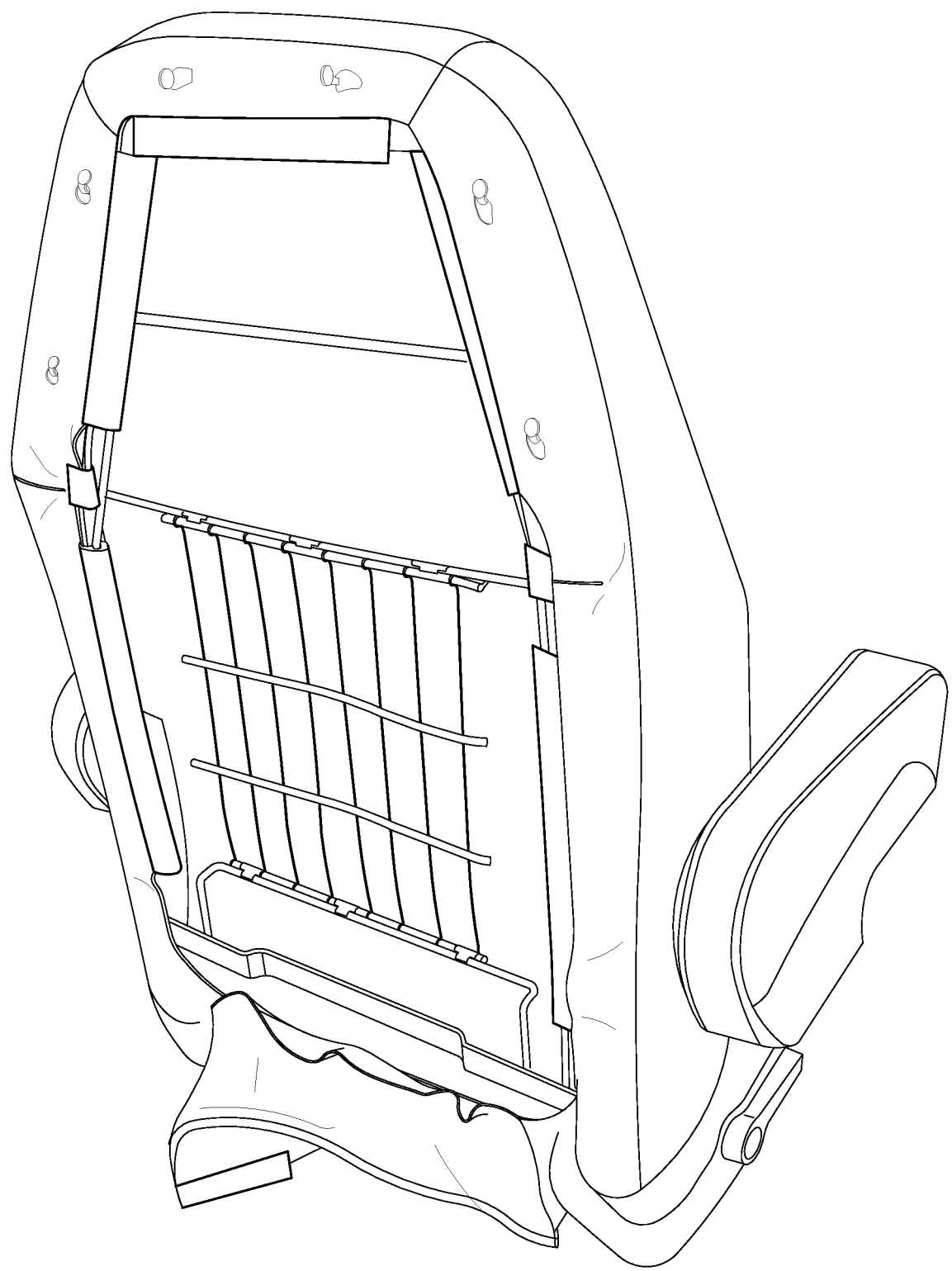
FIGS. 1-3 show a prior art seatback.
Figure 2:
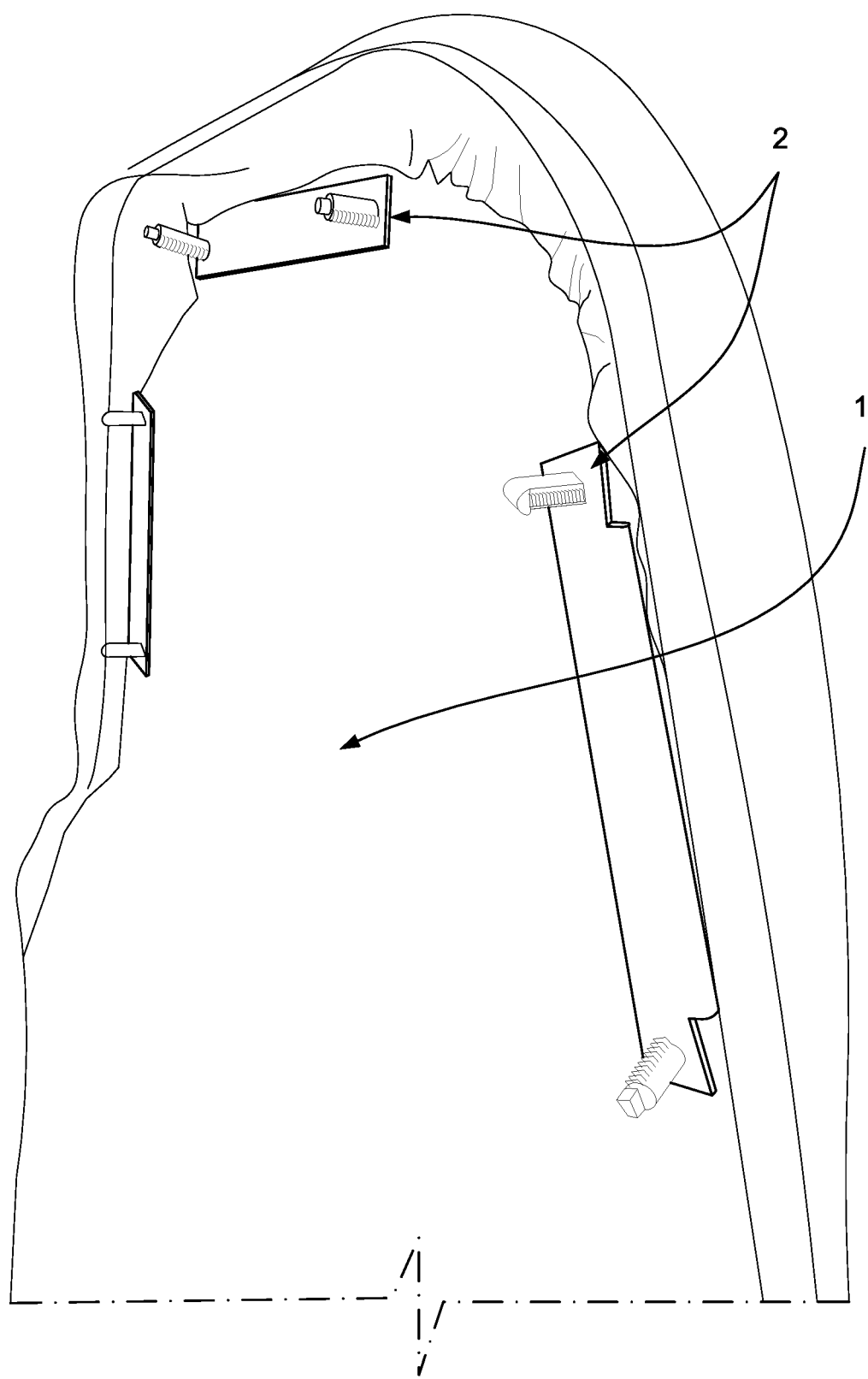
Figure 3:
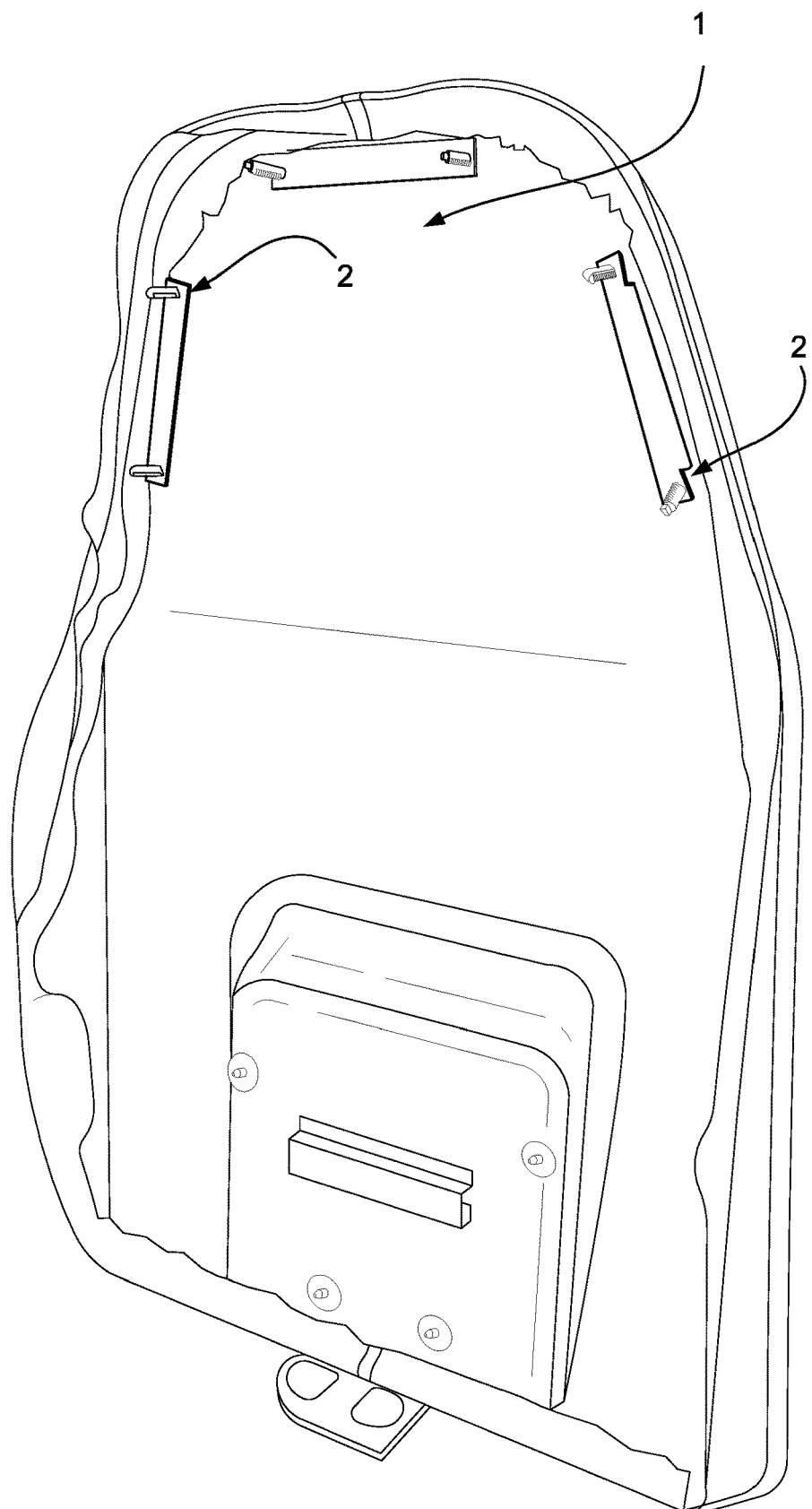
Figure 4:
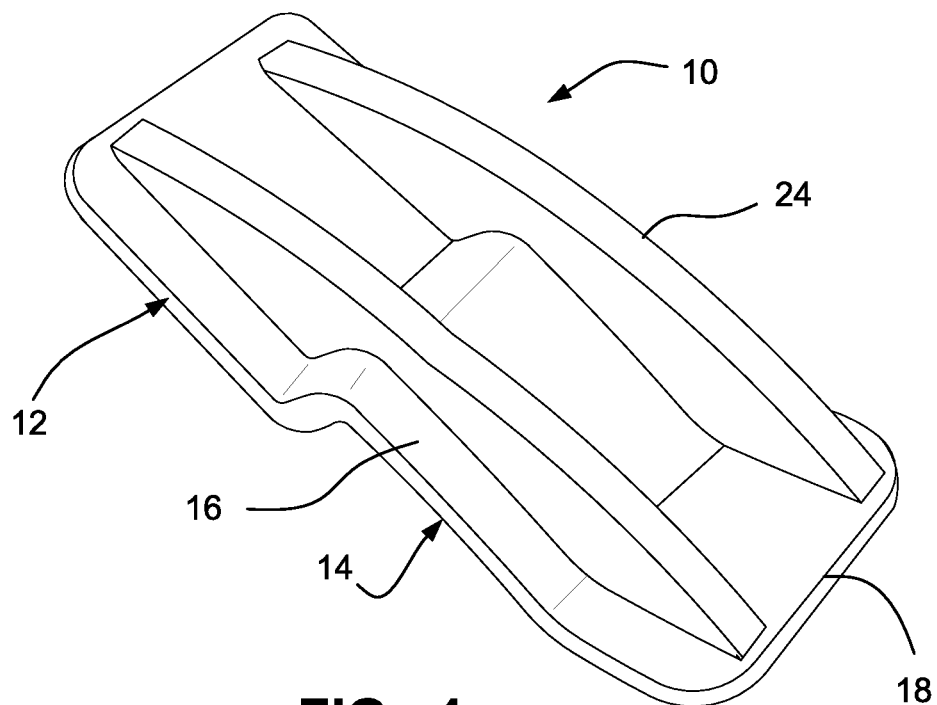
FIG. 4 shows a support member of the described embodiments viewed from the topside showing a pair of reinforcing ribs extending from the base at one end to the terminal end at another end.
Figure 5:
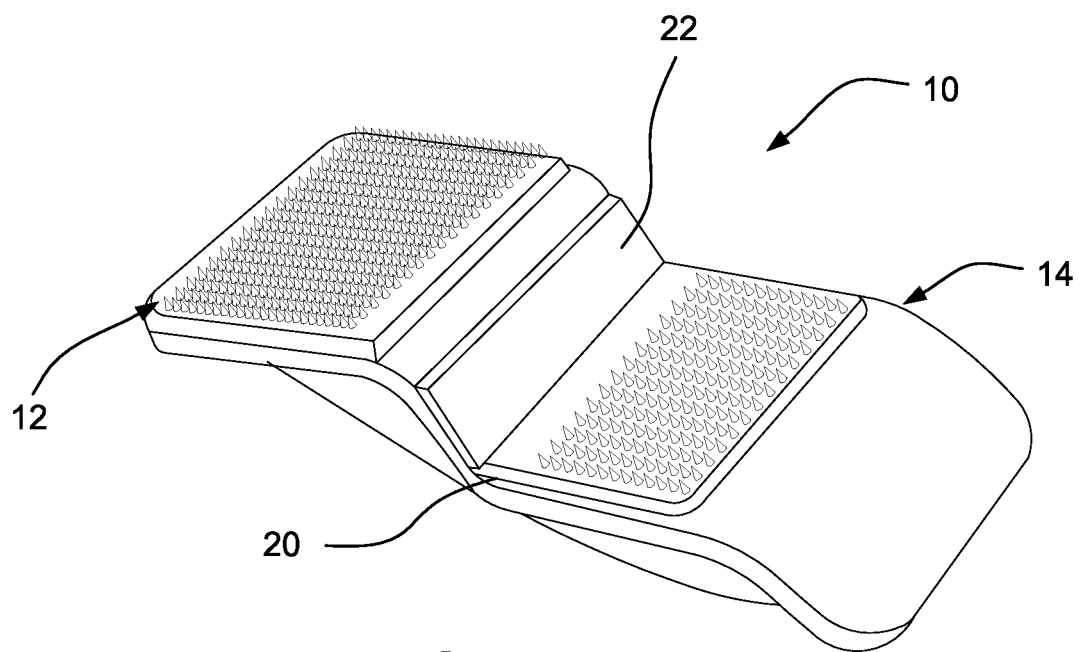
FIG. 5 shows an embodiment of the support member viewed from the underside showing the elbow and bearing surface between the base and the terminal end.
Figure 6:
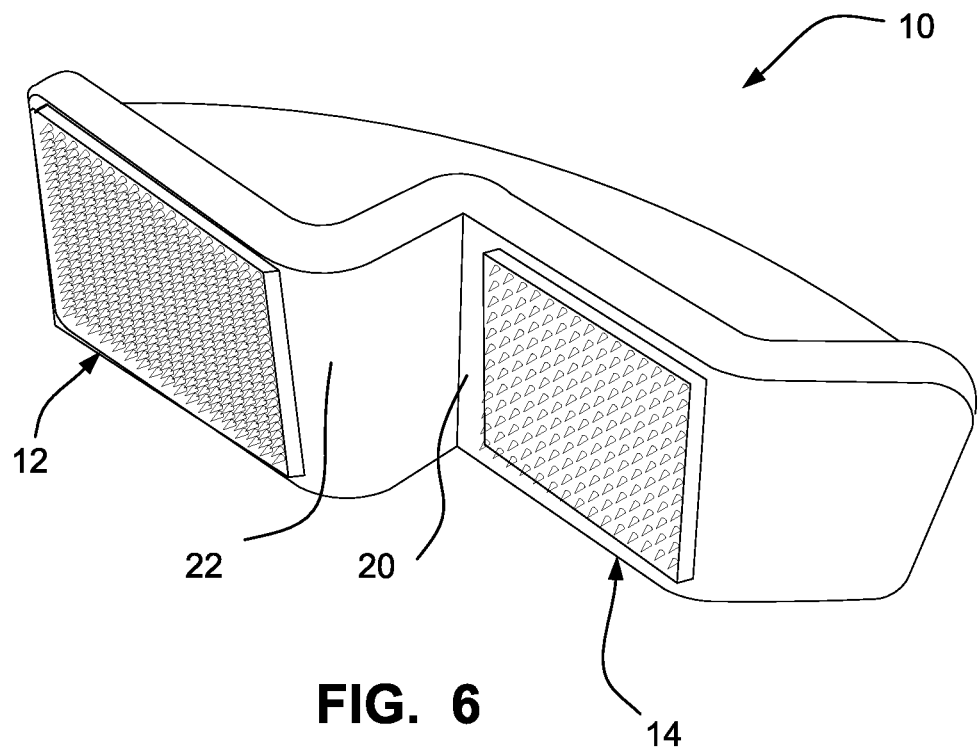
FIG. 6 shows the embodiment of the support member of FIG. 5 from a different perspective.
Figure 7:
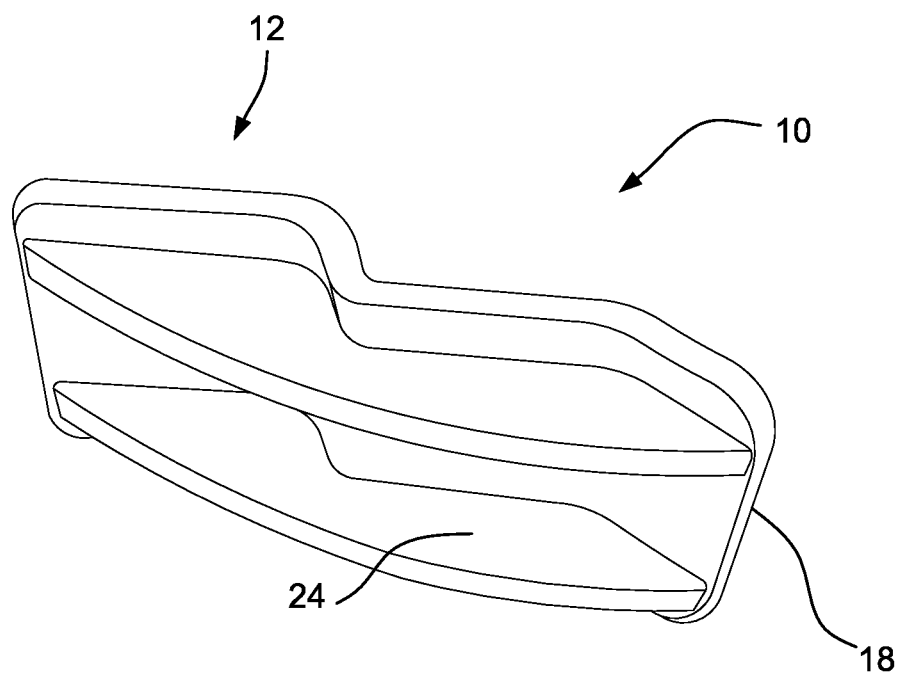
FIG. 7 shows the embodiment of the support member of FIG. 5 from another perspective.

Referring to FIGS. 4-7, in one aspect of the described embodiments, a support member 10 for a seatback shell includes a base 12 and an arm 14 extending outwardly from the base. The arm has a topside 16 and a terminal end 18. An elbow 20 is formed between the base 12 and the terminal end 18. The elbow 20 includes a bearing surface 22 on an underside opposite the topside 16. At least one reinforcing rib 24 is formed on the topside of the arm 14 extending from the base 12 at one end to the terminal end 18 at another end.

Figure 8:
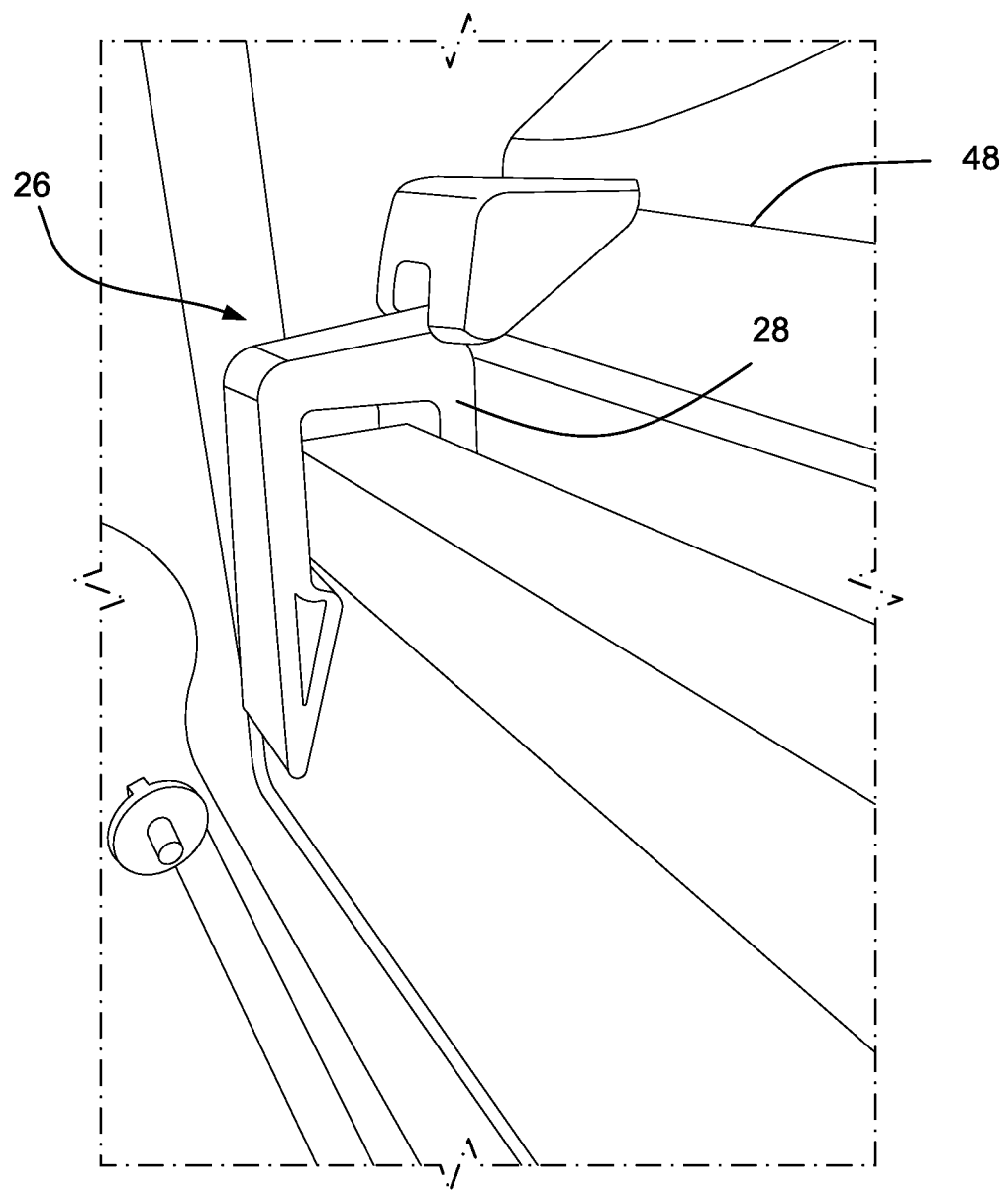
FIG. 8 shows an embodiment of the fastening member with its base secured to the lower riser structure, which is in turn secured to the back of the seatback shell. The fastening member is shown with the step snap fitted against the lower seatback frame element and the frame element positioned in the underside cradle of the lever arm of the fastening member.
Figure 9:
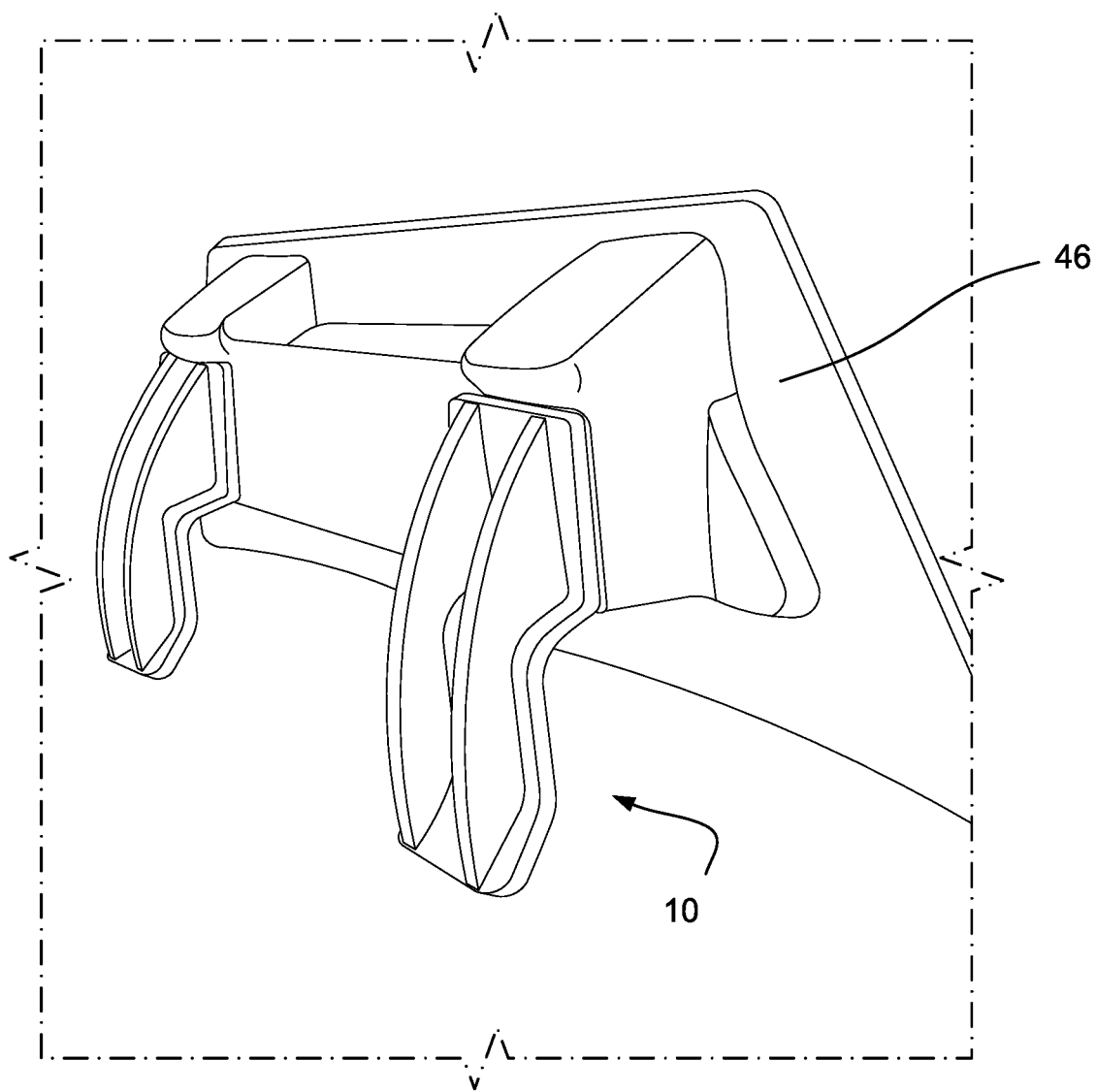
FIG. 9 shows an embodiment having two support members secured to the upper riser structure, which is secured to the back of the seatback shell.
Figure 10:
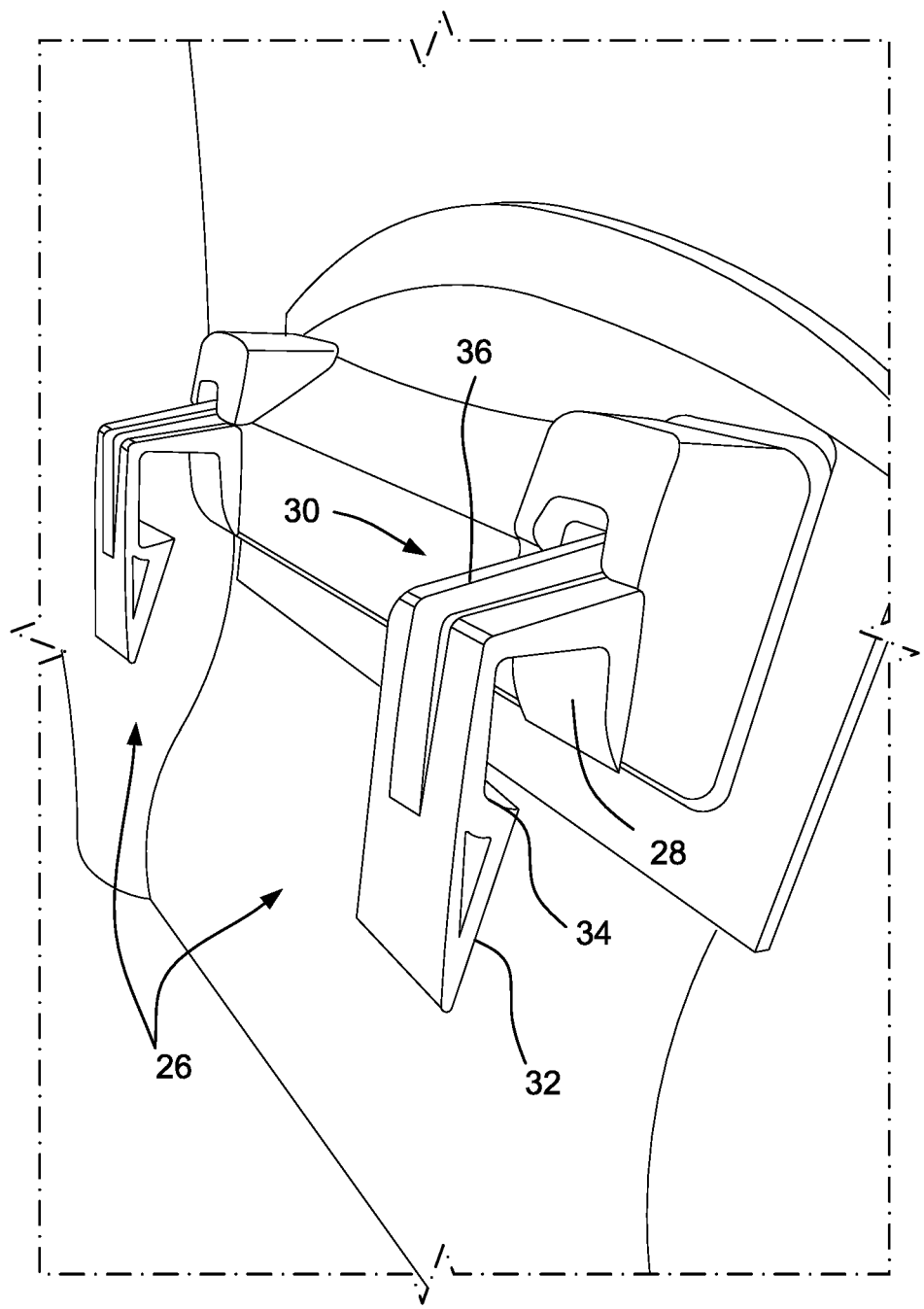
FIG. 10 shows an embodiment having two fastening members secured to the lower riser structure, which is secured to the back of the seatback shell.

A fastening member 26 for a seatback shell includes a base 28. See FIGS. 8 and 10. A resilient lever arm 30 extends outwardly from the base 28. A cam surface 32 and a step 34 are formed on an underside. The lever arm 30 is shaped to define an underside cradle for receiving a seatback frame member, and a spine 36 is formed in a top surface opposite the underside extending between the base 28 and the step 34.

Figure 11:
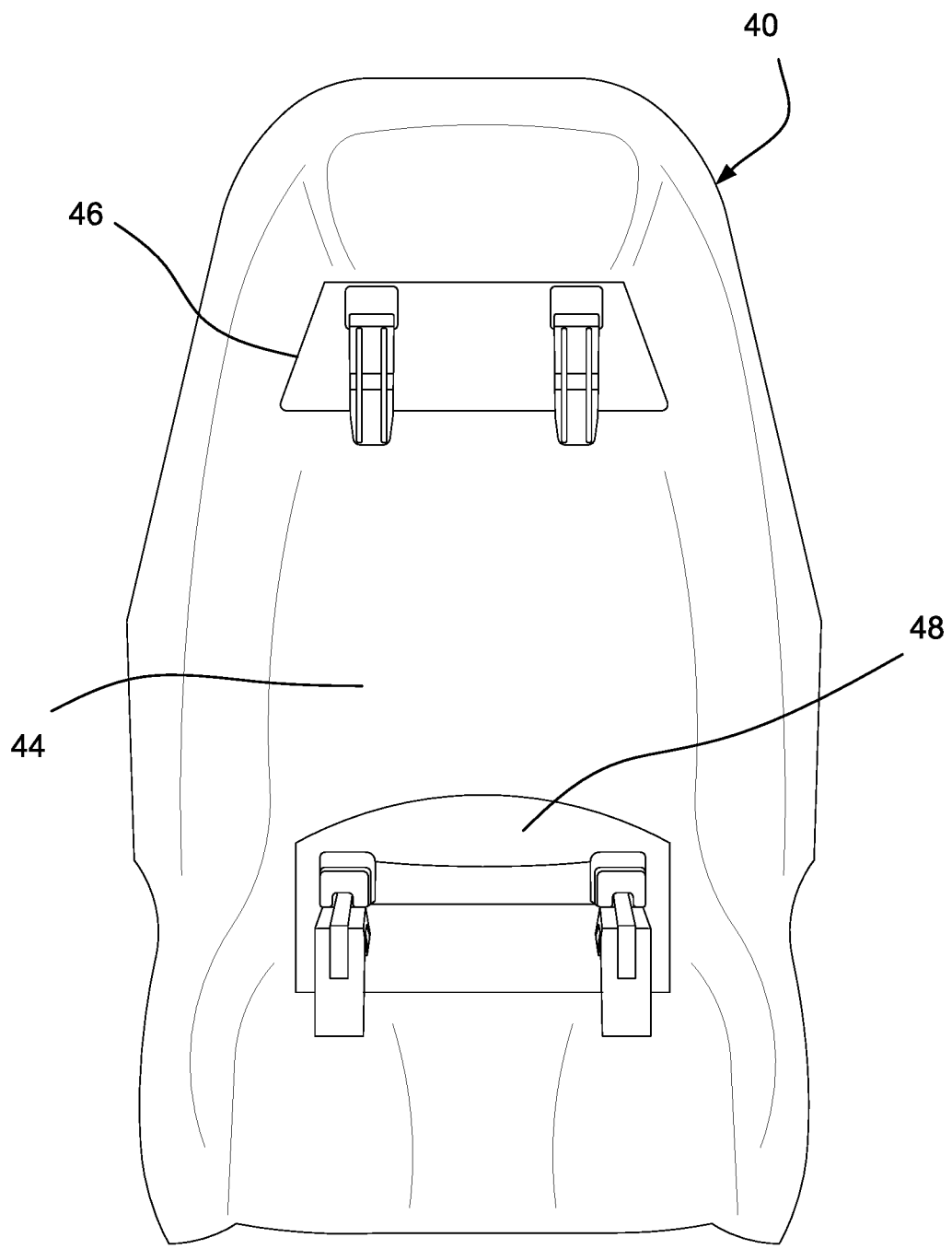
FIG. 11 shows an embodiment of a seatback shell having two support members secured to the upper riser structure and two fastening members secured to the lower riser structure, and each of the upper and lower riser structures is secured to the back of the seatback shell.
Figure 12:
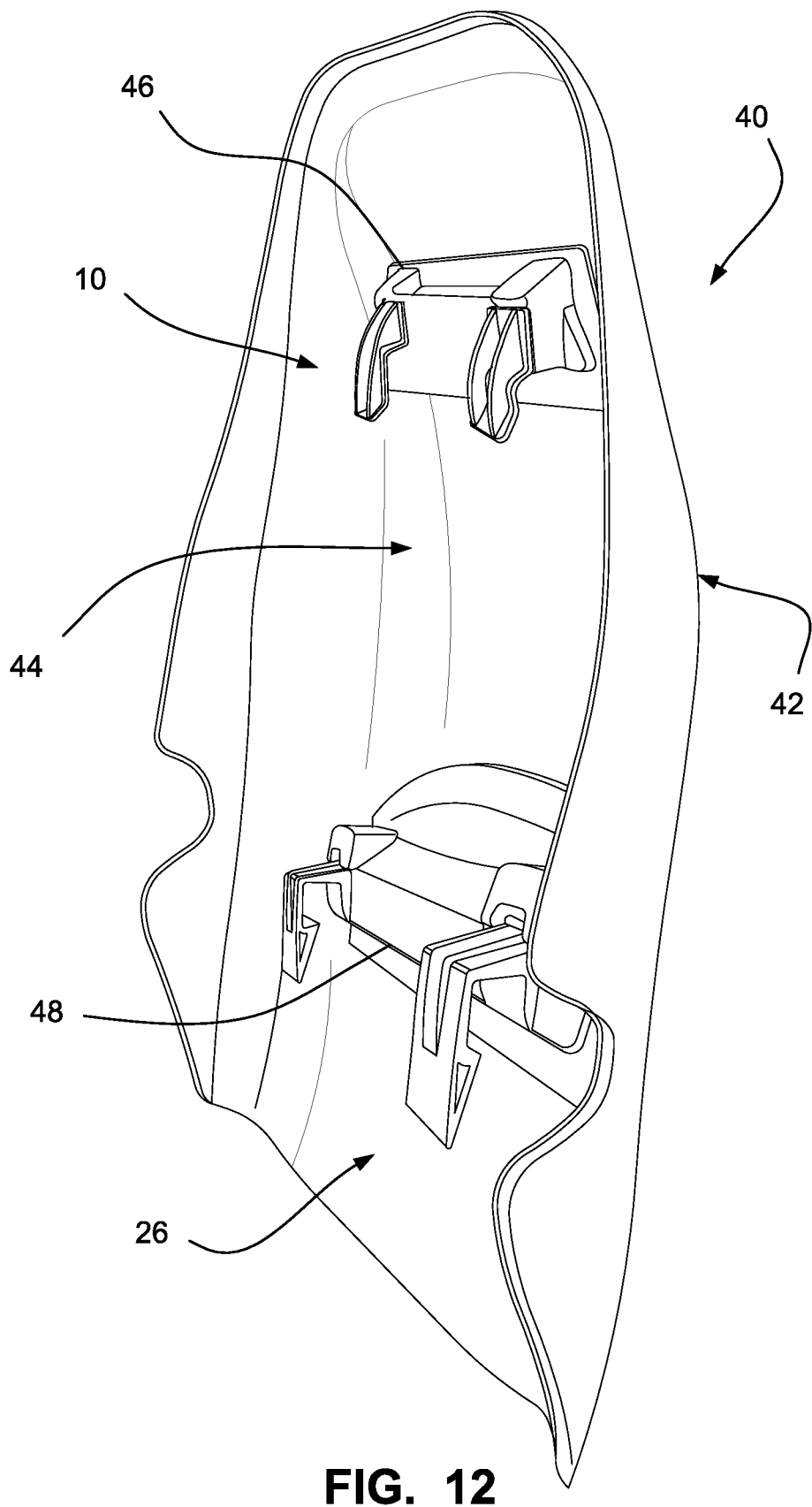
FIG. 12 is a perspective view of the embodiment of the seatback shell of FIG. 11 viewed from a different perspective.

Preferably, with reference to FIGS. 11 and 12, there are two of each supporting members 10 and fastening members 26. The supporting and fastening members are preferably formed from plastic. The supporting members 10 and fastening members 26 may be formed using any one of several processes known by those of ordinary skill in the art. Preferably, the supporting member(s) 10 and the fastening member(s) 26 are formed by known methods of plastic extrusion, and more preferably by negative manufacturing or plastic injection or heat molding.

Figure 13:
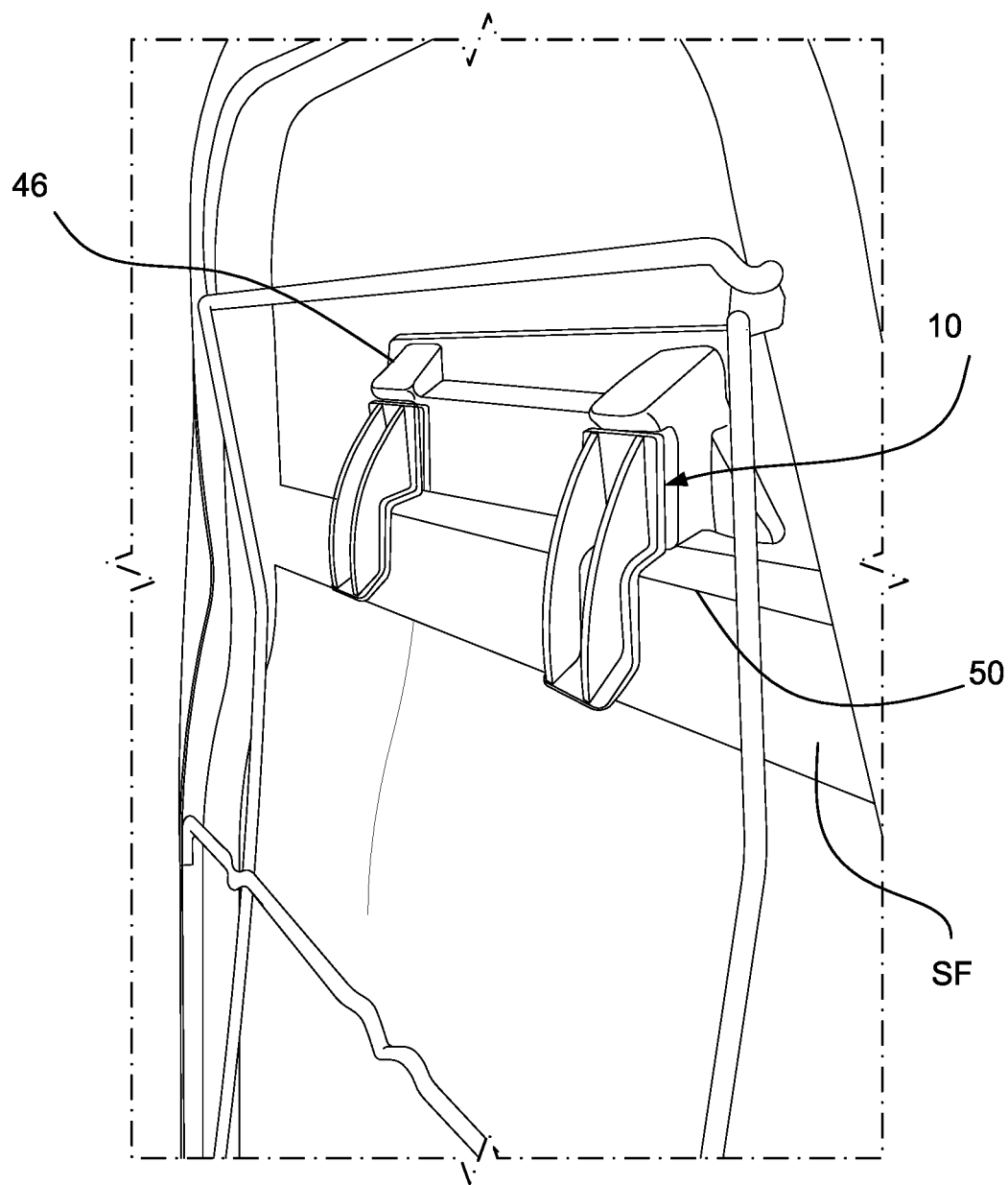
FIG. 13 is close-up view of the seatback shell having two support members secured to the upper riser structure and engaging with the seatback frame.
Figure 15:
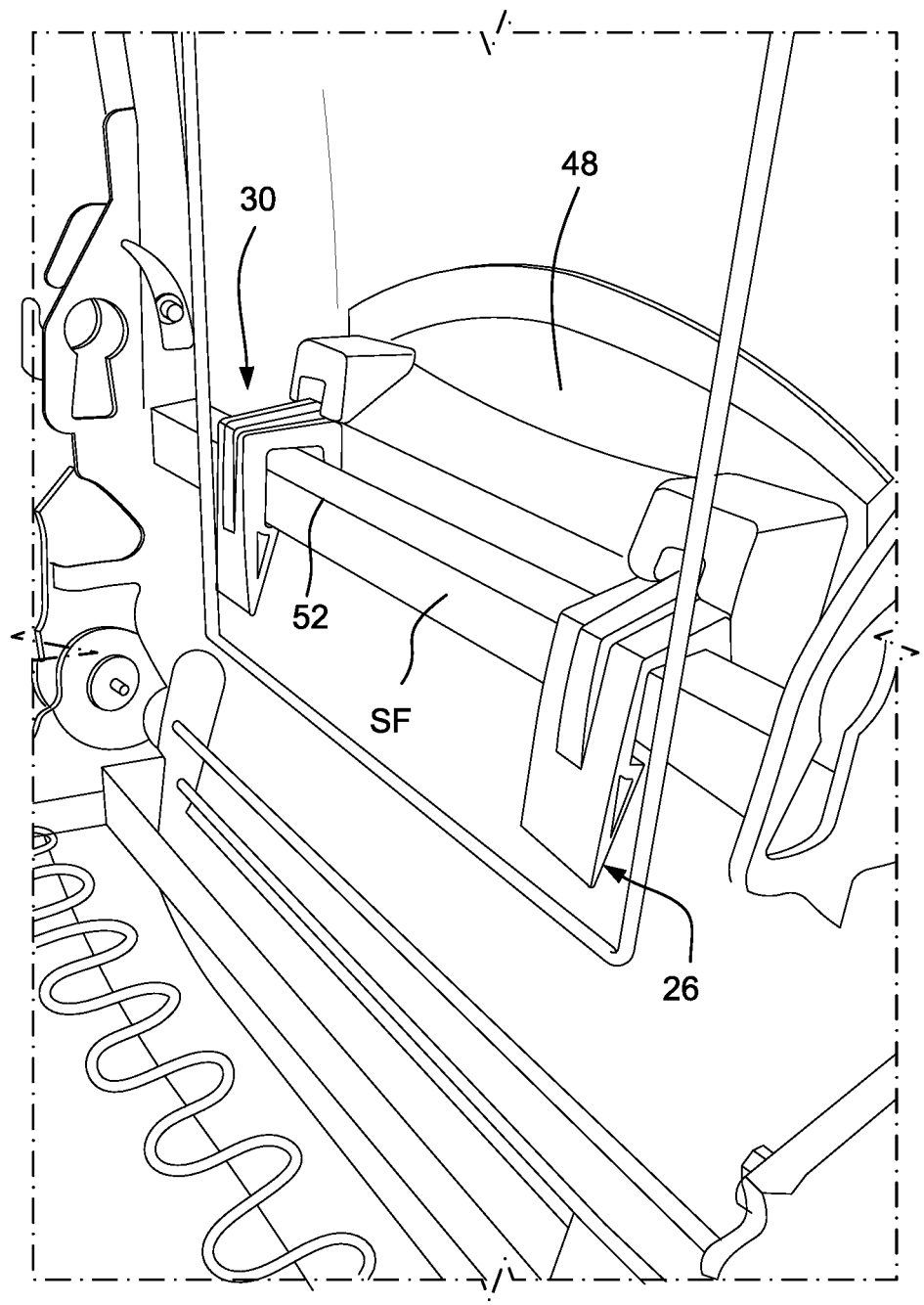
FIG. 15 shows the seatback shell having two fastening members secured to the lower riser structure with the lower seatback frame elements snap-fitted in the cradle of each of the fastening members.
Figure 16:
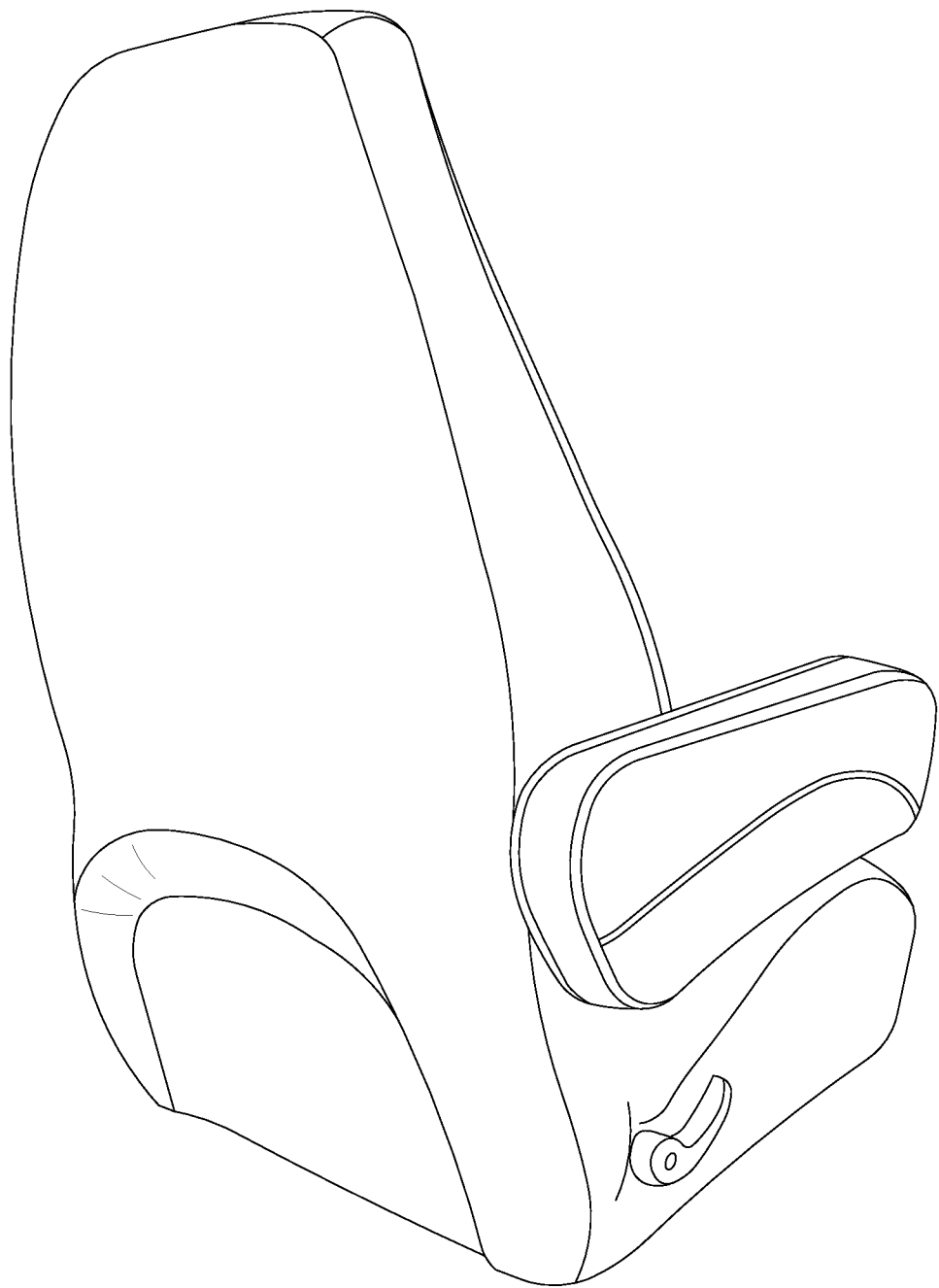
FIG. 16 shows the seatback shell secured to a finished seat product.

A seatback shell 40 is preferably molded from plastic using known methods. The seatback shell 40 has a front 42 and back 44. See FIGS. 11 and 12. At least one support member 10 with base 12 is secured to the back 44 of the seatback shell 40. At least one support member 10 includes an outwardly extending arm 14 with an elbow 20. A bearing surface 22 is located on an underside of the support member 10. With reference to FIG. 13, the elbow 20 is shaped to mate with an upper seatback frame element 50 to support the seatback shell 40 on a seatback frame SF. At least one fastening member 26 is provided. The fastening member 26 also has a base 28 secured to the back 44 of the seatback shell 40, and an outwardly extending resilient lever arm 30 with a cam surface 32 and a step 34 are formed on an underside. As shown in FIG. 15, the lever arm 30 is shaped to define an underside cradle that engages a lower seatback frame element 52 to secure the seatback shell 40 on a seatback frame SF.

Figure 17:
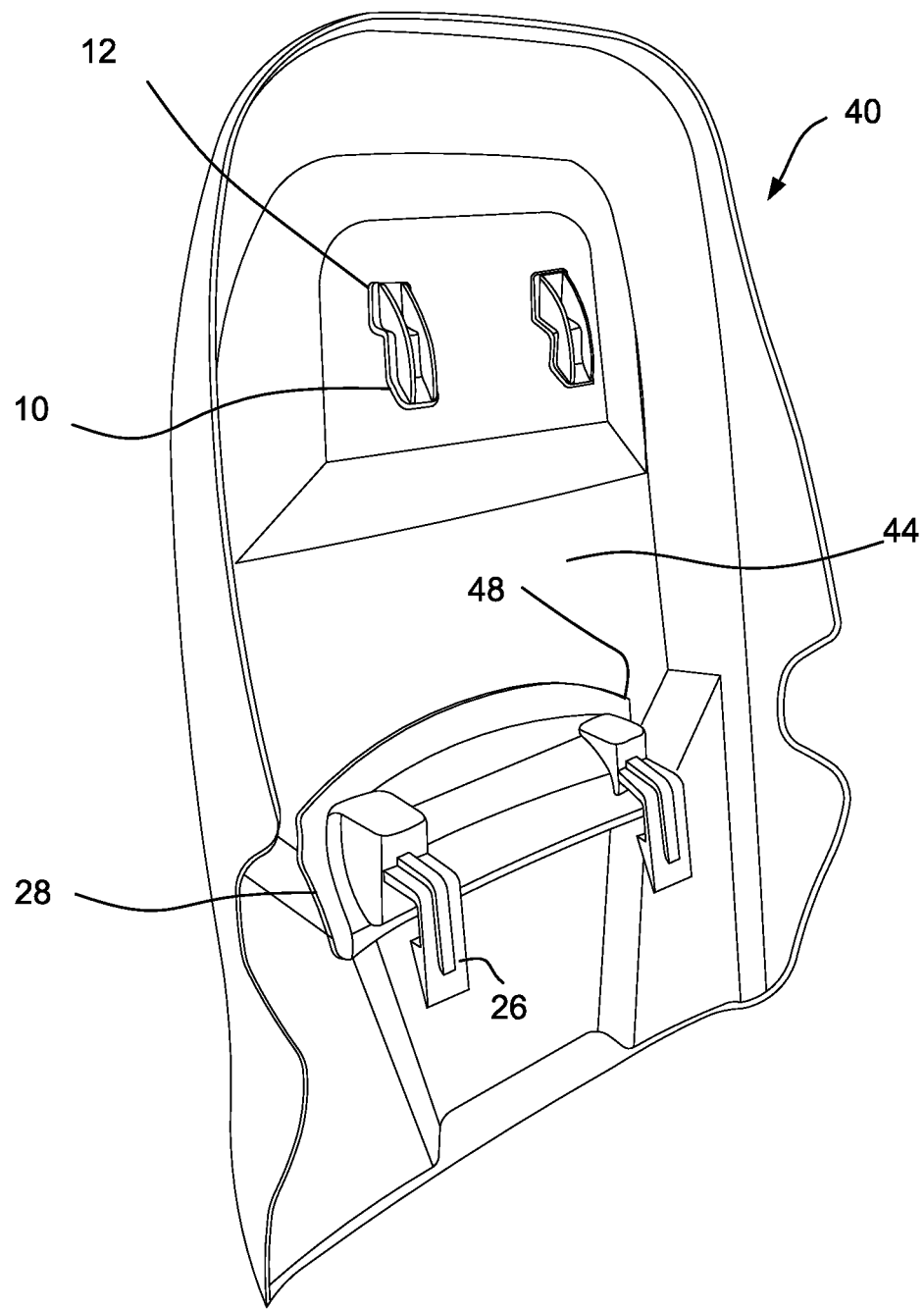
FIG. 17 shows an alternative embodiment of a seatback shell where the two support members are secured directly to the back of the seatback shell without an upper riser structure.

In another aspect, the seatback shell 40 may include an upper riser structure 46 and a lower riser structure 48. Each of the upper and lower riser structures 46, 48 is secured to the back 44 of the seatback shell 40, and the base 12 of the at least one support member 10 is secured to the upper riser structure 46, and the base 28 of the at least one fastening member 26 is secured to the lower riser structure 48. In an alternate embodiment shown in FIG. 17, one or both of the at least one support member 10 and the at least one fastening member 26 may be secured directly to the back 44 of the seatback shell 40 by their respective bases 12, 28. In FIG. 17, the seatback shell 40 omits the upper riser structure 46 and the base 12 of the at least one support member 10 is secured directly to the back 44 of the seatback shell 40. For example, the support members may be secured by adhesives, fasteners, or any other method suitable for direct securement to the back of the seatback shell.

The upper riser structure 46 and the lower riser structure 48 are preferably formed from plastic. Any one of several processes known by those skilled in the art may be employed to form the upper and lower riser structures. Preferably, the upper and lower riser structures are formed by known methods of plastic injection or heat molding.

A method for removably securing a seatback shell 40 to a seatback frame SF includes: (i) providing at least one support member 10 having a base 12 and an arm 14 with an elbow 20 outwardly extending from the base 12; (ii) shaping the elbow 20 of the arm 14 to mate with an upper seatback frame element 50; (iii) providing at least one fastening member 26 having a base 28 and a resilient lever arm 30 extending outwardly from the base 28; (iv) forming a cam surface 32 and a step 34 on an underside of the lever arm 30, and shaping the underside or the lever arm 30 to define an underside cradle; (v) securing the at least one support member 10 and the at least one fastening member 26 to an upper portion and a lower portion of the back 44 of the seatback shell 40, respectively, so that the arm 14 of the at least one support member 10 and the lever arm 30 of the at least one fastening member 26 extend in a direction outward from the back 44 of the seatback shell 40; (vi) lowering the seatback shell 40 onto the seatback frame SF from a top of the seatback frame SF toward a seat of the seatback frame so that the arm 14 of the at least one support member 10 contacts the upper seatback frame element 50 and the resilient lever arm 30 of the at least one fastening member 26 contacts the lower seatback frame element 52; and (vii) applying an inward and downward force to the seatback shell 40 in a direction toward the seat of the seatback frame SF to guide the cam surface 32 over the lower seatback frame element 52 until the step 34 catches the lower seatback frame element 52 to snap-fit the fastening member 26 against the lower seatback frame element 52 so that the upper seatback frame element 50 is made to bear against the bearing surface 22 of the at least one support member 10 and the lower seatback frame element 52 is positioned in the underside cradle, and the seatback shell 40 is removably secured to the seatback frame SF.

Figure 14:
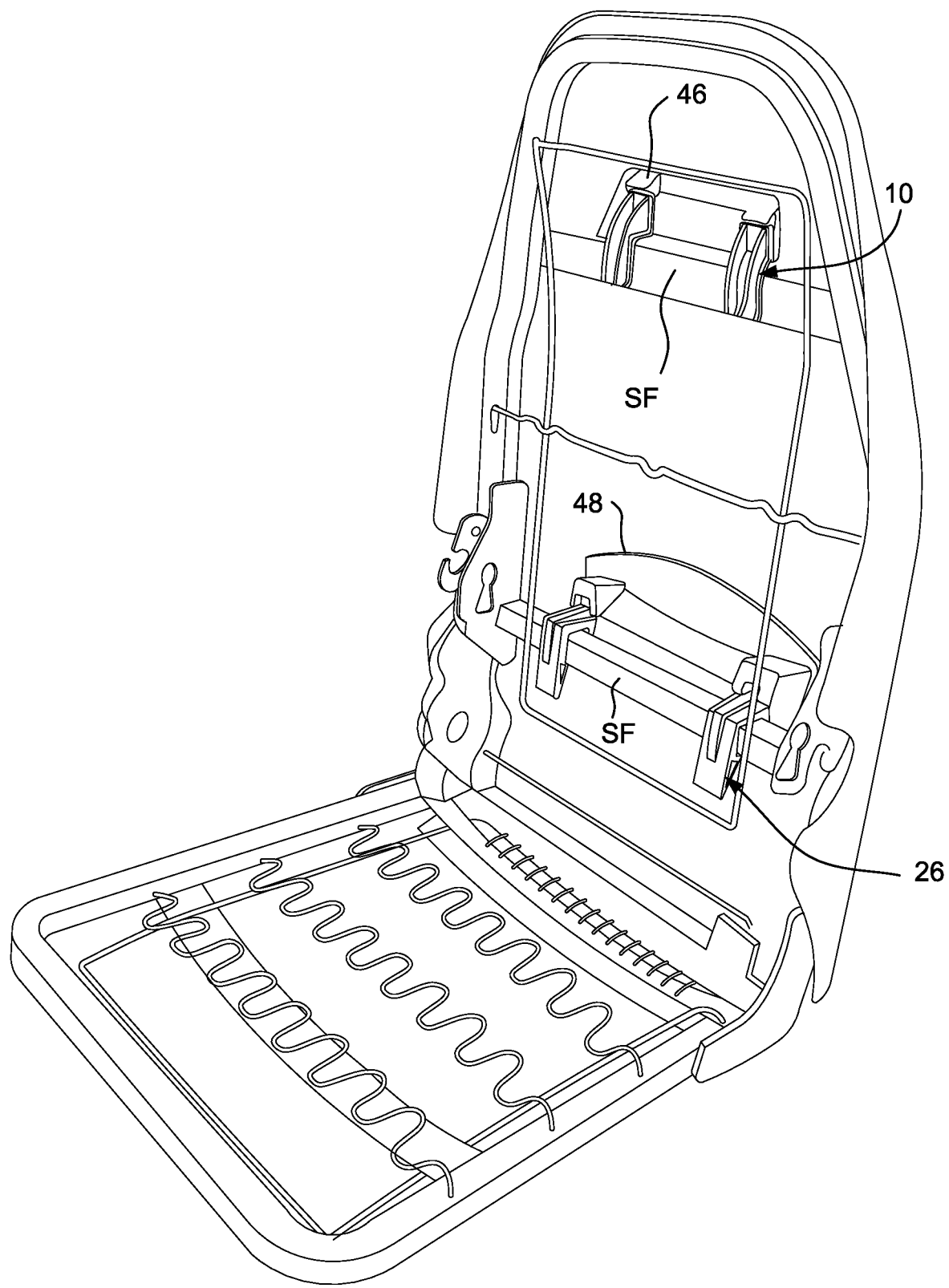
FIG. 14 shows the seatback shell secured to a seatback frame. The upper frame element is shown bearing against the bearing surface of each of the support members. The lower frame element is positioned in the underside cradle of each of the fastening members. Two support members are secured to the upper riser structure, and two fastening members are secured to the lower riser structure, and each of the upper and lower riser structures is secured to the back of the seatback shell.

As shown in FIGS. 12-17, the device and method of the described embodiments include the self-guiding and snap-fitting fastening member(s) 26 and the upper support members 10 that attach to the seatback frame elements 50, 52 and removably secure the seatback shell 40 to the seatback frame SF to achieve an aesthetically pleasing seatback. The method also allows the seatback shell 40 to self-center during install on the seatback frame SF since it is not restricted to small, sparsely located and difficult to align attachment holes. The design allows the support members 10 and fastening members 26 to slide side-to-side thus maintaining a centered alignment of the seatback shell 40 on the frame SF (FIG. 14). The design of the fastening member 26, by being longer on the inboard side, allows for flexing in order to release the snap-fit of the lever arm 30 and lift the seatback shell 40 off the lower and upper frame elements 50, 52 for easy on-site removal and replacement.

The seatback shell attachment method of the described embodiments resolves the problems of the prior art. The method permits the seatback shell to merely slide downward onto the frame supports and easily snap-fit onto the seatback frame. The seatback/method improves manufacture and seating dynamics as a result of the universality of the support and fastening members while facilitating seat and seatback shell design interchangeability, which may be conveniently performed onsite.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A seatback shell mounting device for removably securing a seatback shell to a seatback frame including an upper seatback frame element and a lower seatback frame element, the seatback shell mounting device comprising:
   at least one support member including a first base securable to the seatback shell and an outwardly extending arm with an elbow, wherein the elbow is shaped to engage the upper seatback frame element; and
   at least one fastening member including a second base securable to the seatback shell and an outwardly extending resilient lever arm with a cam surface and a step formed at an end of the cam surface, wherein the lever arm defines an underside cradle engageable with the lower seatback frame element, wherein the step is positioned relative to the cam surface to engage an underside of the lower seatback frame element.

2. A seatback shell mounting device according to claim 1, further comprising an upper riser structure and a lower riser structure each securable to the seatback shell, wherein the first base of the at least one support member is secured to the upper riser structure, and wherein the second base of the at least one fastening member is secured to the lower riser structure.

3. A seatback shell mounting device according to claim 1, wherein the at least one support member has a pair of reinforcing ribs formed on a topside extending from the first base to a terminal end, and wherein the at least one fastening member has a central spine formed in a top surface opposite the underside cradle and extending substantially between the second base and the step.

4. A seatback shell mounting device according to claim 1, comprising two support members engageable with the upper seatback frame element and two fastening members engageable with the lower seatback frame element.

5. A seatback shell mounting device according to claim 1, wherein the at least one support member is secured directly to the seatback shell.

6. A seatback assembly, comprising
   a seatback shell;
   a support member secured to the seatback shell, the support member including an outwardly extending arm with an elbow;
   a fastening member secured to the seatback shell, the fastening member including an outwardly extending resilient lever arm with a cam surface and a step formed on an underside the lever arm defining an underside cradle; and
   a seatback frame including an upper frame element and a lower frame element, wherein when the seatback shell is secured to the seatback frame, the outwardly extending arm of the support member engages the upper frame element from above the upper frame element, and the fastening member engages the lower frame element.

7. A seatback assembly according to claim 6, wherein the resilient lever arm is flexible, and wherein the cam surface is configured to deflect the resilient lever arm outward when the cam surface engages the lower frame element until the lower frame element reaches the step, after which the underside cradle engages the lower frame element in a snap-fit.

8. A seatback assembly according to claim 7, wherein when the underside cradle engages the lower frame element, the support member is positioned to bear against the upper frame element.

9. A seatback assembly according to claim 8, wherein the seatback shell is removable from the seatback frame.

10. A seatback assembly according to claim 9, wherein the resilient lever arm is manually displaceable to clear the step from the lower frame element, after which the seatback shell is removable from the seatback frame.

11. A seatback assembly according to claim 6, further comprising an upper riser and a lower riser each secured to the seatback shell, wherein the support member is secured to the upper riser, and the fastening member is secured to the lower riser.

12. A seatback assembly according to claim 6, wherein the support member has a pair of reinforcing ribs formed on a top side extending from a first base to a terminal end, and the fastening member has a central spine formed in a top surface opposite the underside and extending substantially between a second base and the step.

13. A seatback assembly according to claim 6, wherein the support member and the fastening member are formed of plastic via plastic injection molding.

14. A seatback assembly according to claim 6, wherein the support member is secured directly to the seatback shell.

15. A method for removably securing a seatback shell to a seatback frame with a seatback shell mounting device including a support member secured to the seatback shell and having an outwardly extending arm with an elbow, a fastening member secured to the seatback shell and having an outwardly extending resilient lever arm with a cam surface and a step formed on an underside of the lever arm defining an underside cradle, the method comprising:

securing the support member and the fastening member to the seatback shell so that the arm of the support member and the lever arm of the fastening member extend in a direction outward from the seatback shell;

lowering the seatback shell onto the seatback frame from a top of the seatback frame toward a seat of the seatback frame so that the arm of the support member contacts a first seatback frame element of the seatback frame and so that the resilient lever arm of the fastening member contacts a second seatback frame element of the seatback frame; and applying a downward force to the seatback shell in a direction toward the seat of the seatback frame to guide the cam surface over the second seatback frame element until the step catches an underside of the second seatback frame element to snap-fit the fastening member against the second seatback frame element, so that the first seatback frame element is made to bear against a bearing surface of the support member, and so that the second seatback frame element is positioned in the underside cradle.

16. A method according to claim 15, wherein the step of applying the downward force to the seatback shell causes the cam surface to deflect the resilient lever arm away from the second seatback frame element.

17. A method according to claim 15, further comprising removing the seatback shell from the seatback frame by manually displacing the resilient lever arm away from the seatback shell to clear the step from the second seatback frame element, and applying an upward force to the seatback shell in a direction away from the seat of the seatback frame.

* * * * *